United States Patent [19]

Sitz et al.

[11] Patent Number: 5,019,610

[45] Date of Patent: May 28, 1991

[54] PROCESS FOR THE PRODUCTION OF POLYMER-MODIFIED ASPHALTS AND ASPHALTS EMULSIONS

[75] Inventors: Gary E. Sitz, Marysville; Roger K. Chatterjee, Columbus, both of Ohio

[73] Assignee: Sherex Chemical Company, Inc., Dublin, Ohio

[21] Appl. No.: 599,700

[22] Filed: Oct. 18, 1990

[51] Int. Cl.$^5$ ............................................. C08F 45/52
[52] U.S. Cl. ...................................... 524/61; 524/59; 524/60; 524/68
[58] Field of Search ...................... 524/59, 60, 61, 62, 524/64, 68

[56] References Cited

U.S. PATENT DOCUMENTS

| | | | |
|---|---|---|---|
| 3,825,513 | 7/1974 | Rostler | 524/61 |
| 3,919,148 | 11/1975 | Winters et al. | 524/59 |
| 4,728,683 | 3/1988 | Smits et al. | 524/68 |

*Primary Examiner*—Paul R. Michl
*Assistant Examiner*—Peter Szekely
*Attorney, Agent, or Firm*—Mueller and Smith

[57] ABSTRACT

Disclosed is a polymer-modified asphalt composition which comprises a mixture of (a) a blend of from about 10 to 75 weight-percent of one or more of a thermoplastic rubber polymer and from about 90 to 25 weight-percent of one or more of a fatty dialkyl amide, and (b) an asphalt cement. Also disclosed is a method of preparing such compositions, which requires gentle stirring only.

19 Claims, No Drawings

PROCESS FOR THE PRODUCTION OF POLYMER-MODIFIED ASPHALTS AND ASPHALTS EMULSIONS

BACKGROUND OF THE INVENTION

The present invention relates to a process for the production of polymer-modified asphalts and asphalt emulsions for use in road construction and repair.

The use of polymer-modified asphalt has received considerable attention in the past few years. Almost everyone in the road building and maintenance industry, including state highway departments, asphalt suppliers, and polymer suppliers, has performed some type of research and development activity or built a trial road with polymer-modified asphalts. The reason for such intense interest in the field is that polymers have been shown to substantially change certain of the physical properties of the asphalt and therefore produce better and longer lasting roads. Some of the properties of asphalt which are affected by the addition of polymers are viscosity, flow, temperature susceptibility, flexibility, and adhesion of aggregates.

Viscosity, flow, and temperature susceptibility are related properties. In general, the addition of polymers to asphalt increases viscosity and flow, and decreases temperature susceptibility. In hot climates, this serves to minimize rutting and deformation of the road surface. Most of these polymers contain butadiene-type monomers imparting "rubber band"-like properties of flexibility and recovery after stretching. This is extremely beneficial in cold climates where cracking presents a problem. In addition, the adhesion of aggregates in chip seals is greatly improved.

Virtually all asphalts used in the United States are products of the distillation of crude petroleum. Asphalt is produced in a variety of types and grades ranging from hard and brittle solids to almost water-thin liquids. Asphalt cement is the basis of all of these products. It can be made fluid for construction uses by heating, by adding a solvent, or by emulsifying it. Hot mix asphalts are used extensively on main highway construction where greater durability is required. When a petroleum solvent, such as naphtha or kerosene, is added to the base asphalt to make it fluid, the product is called a cutback. When asphalt is broken into minute particles and dispersed in water with an emulsifier, it becomes an asphalt emulsion. The tiny droplets of asphalt remain uniformly suspended until the emulsion is used for its intended purpose.

When combined with an appropriate hydrocarbon solvent, the asphalt cement in a cutback is in solution. In an emulsion, the chemical emulsifier is oriented in and around droplets of asphalt cement, thus influencing their dispersion and stable suspension in water. When either a cutback or an emulsion is used in the field, evaporation of the asphalt carrier (i.e., the cutback hydrocarbon solvent or the emulsion water) causes the cutback or emulsion to revert to asphalt cement. In the case of the emulsion, the chemical emulsifier is retained with the deposited asphalt. Because environmental considerations militate against the use of cutback asphalts, due to the necessary solvent expulsion from these applied asphaltic compositions, asphalt emulsions are greatly preferred. These may be divided into three general categories: cationic, anionic, and nonionic emulsions.

Cationic and anionic emulsions are those more commonly used in roadway construction and maintenance. As their names imply, such emulsions utilize anionic or cationic emulsifiers to form an oil-in-water emulsion which can be used alone or combined with aggregate for use in the road construction and maintenance industry.

Emulsions are further classified on the basis of how quickly the asphalt will coalesce, i.e., revert to asphalt cement. The terms RS, MS, and SS have been adopted to simplyfy and standardize this classification. They are relative terms only and mean rapid-setting, medium-setting, and slow-setting, in reference to anionic emulsions. Corresponding rapid-, medium, and slow-setting cationic emulsions are termed CRS, CMS and CSS, respectively. The tendency to coalesce is closely related to the mixing of an emulsion. An RS/CRS emulsion has little or no ability to mix with an aggregate, an MS/CMS emulsion is expected to mix with coarse but not fine aggregate, and an SS/CSS emulsion is designed to mix with fine aggregate.

Chemically, asphalts are complex aggregations of rather large aliphatic and cyclic hydrocarbon molecules. Besides the obvious hydrocarbon content, additional constituents in asphalts may include oxygen, sulfur, and nitrogen (often in substantial quantities) and iron, nickel, and vanadium (present usually in trace quantities). Asphaltic mixtures composed of mineral aggregate and bituminous constituents are used widely in the road construction industry.

Aggregate used in road construction can be hydrophilic or hydrophobic depending upon the nature of the material. While the aggregate can include various mineral materials such as cinders or slags, typically the aggregate is of natural origin such as sand, rock, or the like, typically to the localities where the roads are being built. For example, limestone, dolomite, silica, sedimentary, metamorphic, or igneous rocks of various other kinds are regularly used in road building.

There are three general types of polymers that are currently being used in the asphalt and road building industries, viz., latex polymers, solid polymers, and ground-up automobile tire rubber. The most commonly used latex polymers are neoprene, SBR (styrene-butadiene-rubber), and natural rubber. The most commonly used solid polymers are SBR, EVA (ethylene-vinyl acetate), SBS (syrene-butadiene-styrene), and SIS (styrene-isoprene-styrene).

One of two methods is commonly employed to incorporate polymers into asphalt. One method involves adding latex polymer to an asphalt emulsion either by addition to the emulsifier solution prior to emulsification or to the emulsion following emulsification. Either way, this method is relatively easy and trouble-free. The second method involves adding solid polymer to the asphalt. This method normally requires substantial mixing and shearing in order to uniformly disperse the polymers, particularly when SBS or SIS block copolymers are used.

Two other methods are utilized less frequently to incorporate polymers into asphalt.

Two other methods are utilized less frequently to incorporate polymers into asphalt. One method involves addition of a latex polymer to hot asphalt, whereby the latex is slowly added and the water flashed off. The other method involves addition of solid polymers to asphalt with heating, stirring, and addition of monomers such as styrene or methyl methacrylate. This mixture reacts to yield a chemically crosslinked polymer which is also chemically attached to the asphalt molecules. Thereafter the asphalt is either emulsified or used "as is" in hot applications.

The addition of polymers to asphalt using latex addition either to the emulsifier solution or post emulsification has been used successfully for many years. Initial problems with latex "creaming," floating to the top of the emulsion, and a severe loss in emulsion viscosity have essentially been solved.

The addition of solid polymers to asphalt has not been as successful as latex addition to emulsions. The major reason for this lack of success has been the extreme difficulty encountered in uniformly dispersing the neat polymers in asphalt. Furher, the emulsions produced from the modified asphalt very often possess lower viscosities.

Styrene-butadiene-styrene, styrene-ethylene/butylene-styrene, and styrene-isoprene-styrene block copolymers are being investigated by many asphalt emulsion manufacturers because of the desirable physical properties they impart to asphalt. The very high tensile strength of these block copolymers is caused by the physical crosslinking that occurs when the blocks of styrene orient themselves in rigid domains forming network similar to chemical crosslinking. The rubber mid-block (butadiene, ethylene/butylene, isoprene) gives the polymers their elasticity. Heat, shear and/or solvent will soften the styrene domains and allow flow which facilitates dispersion in asphalt. However, uniform dispersion of the polymers in asphalt requires high-speed, high-shear mixers.

In an attempt to overcome the difficulties of dispersion, manufacturers of the SBS and SIS block copolymers have begun to plasticize various grades of the polymers with aliphatic, aromatic, or naphthenic oils. These oils are intended to separate or pre-dissolve or pre-disperse the styrene domains in order that the resulting mixture of polymer and oil might disperse readily in the asphalt. However, it has been the experience of those skilled in the art that vigorous stirring is nevertheless nearly always required in order to achieve uniform dispersion. Oil-extended blends are now being used in an attempt to alleviate the necessity for such stirring, but have in general resulted in a deterioration of emulsion quality: storage stability is often unacceptable, and emulsion viscosity can be extremely low (i.e., less than 100 SSF at residues as high as 71+%).

Accordingly, there exists a need for a polymer-modified asphalt which can be conveniently and economically prepared without high-speed, high-shear mixing equipment, and for asphalt emulsions prepared from the same polymer-modified asphalt which possess both excellent viscosity and storage stability.

BROAD STATEMENT OF THE INVENTION

The present invention relates to a process for preparing polymer-modified asphalts which comprises first blending one or more thermoplastic rubber polymers and one or more fatty dialkyl amides, with heating and gentle stirring, and then dispersing the resultant polymer blend into asphalt cement with simple recirculation or paddle stirring. Fatty dialkyl amides efficaciously employed in the invention may be represented by the following general structure:

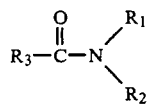

wherein:
R$_1$ and R$_2$ are the same or different moieties and are selected from C$_1$–C$_8$ alkyl groups; and
R$_3$ is a C$_6$–C$_{22}$ alkyl group.

Asphalts so prepared can be used in hot applications or can be further processed into emulsions. Such emulsions are of very good quality, possess excellent stability, and exhibit good viscosities at relatively low asphalt residue levels.

DETAILED DESCRIPTION OF THE INVENTION

Polymers which may be utilized in the present invention are well-known, commercially available thermoplastic rubber polymers. A rubber is defined as an elastic, resilient cohesive solid made from the juice of certain tropical trees or similar synthetic materials. Such rubbers are readily prepared as is widely described in patents and the published literature by polymerizing such monomers as styrene, butadiene, ethylene, butylene, and isoprene and other alpha olefins. A thermoplastic polymer is one that softens and flows when exposed to heat, and returns to its original consistency when cooled.

These polymers may posses a linear, diblock, triblock or radial structure. Preferred for use in the present invention are triblock copolymers. A copolymer is defined as a polymer produced by the simultaneous polymerization of two or more dissimilar monomers, a block copolymer as one whose structure is composed of alternating sections of one monomer separated by sections of a different monomer or a coupling group of low molecular weight, and a triblock thermoplastic rubber copolymer as one having an elastomeric block in the center and a thermoplastic block on each end. The thermoplastic block has a glass transition temperature well above room temperature whereas the elastomeric block has a glass transition temperature well below room temperature. Thus, these two blocks are thermodynamically incompatible. It is this incompatibility that imparts to these polymers the useful properties described herein.

The preferred polymer will have a molecular structure comprising block segments of styrene monomer units and rubber monomer units. Each such block segment may consist of 100 monomer units or more. The resultant polymer is thus composed of two phases, a first phase consisting of polystyrene end blocks and a second phase consisting of a rubbery midblock, usually polyisoprene, poly(ethylene-butylene), polybutadiene, or the like. The physical crosslinking and reinforcing properties of the polystyrene domains provide these polymers with high tensile strength, whereas the rubber midblock provides elasticity. This particular structure allows the polymers to soften and flow under shear when heated, yet recover their strength and elastomeric properties upon cooling.

Some polymers which have been found to work well in the practice of the present invention are Kraton thermoplastic rubbers (available from Shell Chemical Company). These include the triblock copolymers of the Kraton D series, wherein the elastomeric midblock of the molecule is an unsaturated rubber, and of the Kraton G series, wherein the elastomeric midblock is a saturated olefin rubber.

Another type of thermoplastic copolymer which works well in the practice of this invention is an ethylene-vinyl acetate polymer. In particular, Elvax resins (available from DuPont Company) have been utilized with good results.

The polymer structure most preferred for use in the present invention is the linear A-B-A block type, exemplified by the SBS and SIS polymers. In addition to A-B-A type polymers, specialized polymers of the radial $(A-B)_n$ or diblock (A-B) types may be used.

The fatty dialkyl amide, constituting the crux of the present invention, may be any such amide capable of dissolving the specific polymer selected. Combinations of polymers and/or amides may also be utilized in order to obtain specific desired properties, as will become apparent to those skilled in the art. The fatty dialkyl amides preferred for use in the present invention may be represented by the following general structure:

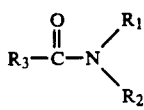

wherein:
$R_1$ and $R_2$ are the same or different moieties and are selected from $C_1-C_8$ alkyl groups; and
$R_3$ is a $C_6-C_{22}$ alkyl group.

The blend of dialkyl amide and polymer is prepared by mixing the two ingredients together and heating, with occasional stirring, until blended and homogeneous. Ordinarily these blends are too viscous to prepare in a standard roundbottom flask with a normal stirring apparatus. A Kitchen Aid mixer (Hobart) with heated bowl is an ideal device for preparation of these blends.

Once the polymer-amide blend reaches homogeneity, it is spread onto a hard surface and allowed to cool. The cooled blend can then be easily handled. The consistency of the blend will range from a viscous liquid to a waxy solid, depending on alkyl chain length and the amount of unsaturation in the alkyl chain.

Further processing of the polymer-amide blend is optional, and a wide range of possibilities should be apparent to those of skill in the art. For instance, it might be advantageous to pulverize, granulate, extrude, powder, or otherwise change the form of solid blends, depending on such factors as intended use, storage, transportation, and the like.

Although it is preferred that the polymer be dissolved in the fatty dialkyl amide, it has also been found in conjunction with the present invention that the addition of fatty dialkyl amides alone to asphalt serves to facilitate dissolution of polymer added independently of the fatty dialkyl amide.

The polymer-amide blend will ordinarily contain from about 10% to about 75% by weight of polymer and from about 90% to about 25% by weight of one or more fatty dialkyl amides. Preferably, the blend will contain from about 40% to about 60% by weight of polymer and from about 60% to about 40% by weight of dialkyl amide. Most preferred is a 50:50 blend of polymer and amide.

The fatty dimethyl amides most preferred for use in the present invention are dimethyl hard tallow amide (DMHTA) and dimethyl stearyl amide (DMSA). When incorporated into 50:50 blends with block copolymers, DMHTA and DMSA form waxy solids which are easily handled. In addition, both DMHTA and DMSA are readily available commercially. DMHTA is the dimethyl amide of choice.

Bitumen used in accordance with the invention may be derived from domestic or foreign crude oil, plastic residues from coal tar distillation, petroleum pitch, asphalts diluted from solvents (cutback asphalts), mineral waxes, and the like. Practically any viscosity- or penetration-graded asphalt cement for use in pavement construction, as described in ASTM designation D-3381 and D-946, may be used in the present invention. The polymer-modified asphalt compositions of the present invention will ordinarily contain from about 1% to about 50% by weight of polymer-amide blend and from about 99% to about 50% by weight of asphalt cement. Preferably, the compositions will contain from about 2% to about 10% by weight of polymer-amide blend and from about 98% to about 90% by weight of asphalt cement.

The polymer-modified asphalt compositions of the present invention may be incorporated into cationic asphalt emulsions by heating and maintaining the polymer-modified asphalt composition at 250°–300° F., preferably at 285°–295° F. The emulsifier and other additives are added to the continuous water phase and neutralized to a pH of about 1.5 to about 4.5, preferably about 2.0 to about 3.0, by the addition of acid, preferably hydrochloric acid. Preferred emulsifiers are Arosurf AA-28 and AA-78 (available from Sherex Chemical Company, Dublin, Ohio), widely used and commercially accepted cationic emulsifiers known to generally produce emulsions with good/high viscosities at relatively low residues, using a variety of asphalts. The emulsifier solution is maintained at 80°–160° F., preferably 100°–125° F. The asphalt and the emulsifier solution are then blended together, preferably with a colloid mill or homogenizer, to obtain the desired emulsion.

The polymer-modified asphalt compositions of the present invention may be incorporated into anionic asphalt emulsions by heating and maintaining the polymer-modified asphalt compositions at 250°–300° F., preferably 285°–295° F. The emulsifier and other additives are added to the continuous water phase and neutralized to a pH of about 8 to about 12 by the addition of caustic, preferably sodium hydroxide. This solution is maintained at 80°–160° F., preferably at 100°–125° F. The modified asphalt and the emulsifier solution are then blended together to obtain the desired emulsion.

If an asphalt emulsion is to be prepared, the preferred bituminous binder material is asphalt of paving grade having a penetration of between 30 and 300 as determined by ASTM test number D5-73 (Penetration of Bituminous Materials). The production, selection and properties of suitable petroleum-derived asphalts for use in accordance with the present invention are commonly known and are described in the literature.

The amount of bituminous binder material used in asphalt emulsions will generally range between about 20% and about 80%, based on the weight of the asphalt emulsion composition, and preferably from about 50% to about 70% by weight.

Additives commonly used in aqueous asphalt emulsions may also be employed in the practice of the present invention. For example, and inorganic salt, e.g., calcium chloride, ammonium chloride, ammonium acetate, ammonium sulfate, sodium sulfate and the like, can be added to cationic asphalt emulsions prepared pursuant to the invention in an amount of up to about 2 % by weight, in order to prolong the emulsion stability and to improve storage stability. Such inorganic or organic salt additives should be water-soluble.

The particle size of the emulsions which may be utilized in the practice of this invention is not particularly critical. Generally, particle size will range from between 0.5 micron to 100 microns in diameter. It is preferred to use an emulsion having a particle size of less than 10 microns.

The pH of cationic emulsions prepared in accordance with the invention may range from about 1 to about 10, with a range of from about 2 to about 7 being preferred. The emulsions will generally be somewhat more stable and possess better viscosity characteristics when the pH is on the acidic side. Nevertheless, neutral or alkaline emulsions may also be used.

Although cationic emulsions were the emulsions of choice for the experimentation conducted in connection with the present invention, it will be apparent to those skilled in the art that anionic emulsions having equivalent efficacy could be prepared by utilizing anionic surfactants and emulsifiers in accordance with procedures known in the art.

In order to qualify as a "good quality emulsion," a cationic emulsion must meet ASTM D-2397 specifications or similar local specifications. Typical cationic rapid-set emulsions (CRS-2) have a critical minimum viscosity and minimum residue specification. There exists a direct correlation between emulsion viscosity and the weight-percent asphalt content in the emulsion. As a general rule, the greater the asphalt content (i.e., the higher the percentage of residue), the higher the viscosity. In an emulsion does not meet the minimum viscosity specification, a typical solution to the problem is to increase the amount of asphalt in the formulation. From a financial standpoint, an emulsion manufacturer attempts to produce a CRS-2 emulsion as close to the minimum residue specification as possible but still meeting the minimum viscosity specification. The reason for this, of course, is that asphalt is the raw material ordinarily contributing the greatest cost to an emulsion. Most emulsions are purchased by government agencies on a low-bid basis; thus, the lower the cost of raw materials, the lower a producer can bid on an agency's requirements. It will be seen in the examples that the residue/viscosity results obtained with the dialkyl amides of the present invention are far superior to those obtained with standard polymers alone, which in many cases fail to meet minimum viscosity specifications. This ability of the dialkyl amides to impart excellent viscosity values at relatively low residue percentages makes the resultant asphalt emulsions enormously attractive from the standpoint of economics as well as performance.

While the preferred use for the asphalt cement compositions of the present invention is in conjunction with aggregate to form road paving materials, they may also be advantageously employed in many other applications, e.g., asphalt roofing cements, mastics, moisture barriers, joint and crack fillers, sheeting, and so forth.

IN THE EXAMPLES

It is believed that one skilled in the art can, using the preceding description and without further elaboration, utilize the present invention to its fullest extent. The following preferred specific embodiments are, therefore, to be construed as merely illustrative and not as limiting the remainder of the disclosure in any way whatsoever.

For convenience several abbreviations are used in the examples. A list of these abbreviations and the terms for which they stand are given below:
DMF = dimethyl formamide
DMODA = dimethyl octadecyl amide
DMCOA = dimethyl cocoamide
DMTA = dimethyl tallow amide
DMHTA = dimethyl hard tallow amide
DMOA = dimethyl oleyl amide
DMCAA = dimethyl canola amide
DMSA = dimethyl stearyl amide
DEHTA = diethyl hard tallow amide
DBHTA = dibutyl hard tallow amide Temperatures are set forth in degrees Fahrenheit. Unless otherwise indicated, all parts and percentages are by weight.

It should be noted that for convenience rapid-set cationic emulsions were evaluated in the examples. Cationic medium-set and slow-set emulsions could be prepared using similar procedures. It is also believed that all three types of anionic emulsions (rapid-, medium- and slow-set) could be equally readily prepared.

EXAMPLE 1

The method employed for preparation of all dialkyl amide-polymer blends tested in accordance with the present invention was as follows: Small sample blends of 100 grams of dialkyl amide, 50 grams of Kraton 1101 SBS block copolymer (Shell Chemical Company), and 50 grams of Kraton 1118 styrene-butadiene branched copolymer (Shell Chemical Company) were prepared by weighing all ingredients into a pint can and then heating the can and contents on a hot plate to 250°–325° F. Contents of the can were stirred occasionally with a metal stirring rod during the first 30 minutes, then continuously until homogeneous and very viscous. The blend was then spread onto a hard surface and allowed to cool.

The specific dialkyl amide-polymer blends prepared and their physical forms are listed in Table 1.

TABLE 1

| Dialkyl Amide | Amide at 77° F. | 50:50 Blend at 77° F. |
| --- | --- | --- |
| DMODA | Liquid | Very viscous liquid |
| DMCOA | Liquid | Very viscous liquid |
| DMTA | Soft solid | Very viscous liquid |
| DMHTA | Solid | Waxy solid |
| DMCAA | Liquid | Very viscous liquid |
| DMSA | Solid | Waxy solid |
| DEHTA | Soft solid | Rubbery solid |
| DBHTA | Soft solid | Rubbery solid |

An attempt was made to prepare amide-polymer blends utilizing amides which lacked $C_1$–$C_8$ dialkyl groups. The same procedure was followed with three such amides: monobutyl hard tallow amide, oleyl diethanol amide, and eurcylamide. It was not possible to dissolve the styrene-butadiene copolymers in these amides, and thus blends could not be prepared.

EXAMPLE 2

An amount of dialkyl amide/polymer blend (prepared in Example 1) equal to 6% by weight of the asphalt to be used was weighed into a container and preheated to about 300° F. To facilitate handling, the heated blend was then added to the asphalt, which was also heated to 290°-300° F. The entire blend was then subjected to simple hand stirring and circulating, which resulted in a uniformly dispersed polymer-asphalt blend.

Two grades of asphalt were selected for use in this example: AC-20, having penetration values of 60-90, and AC-5, having penetration values of 160-200 (both available from Ashland Oil, Inc.). AC-20 is preferred over softer grades of asphalt because the dimethyl amide remains in the asphalt after the emulsion breaks and exerts a softening effect. This effect must be taken into consideration, as polymer-modified asphalt emulsion residues typically must meet normal emulsion residue specifications of 100-250 penetration. Incorporation of 6% of the polymer-amide blend softened AC-20 from 60-90 pen to 130-150 pen, the range desired, whereas AC-5 was softened from 160-200 pen to 210-280 pen.

When the dialkyl amide used was dimethyl hard tallow amide or dimethyl stearyl amide, the dimethyl amide/polymer blend was a waxy solid and no preheating was necessary.

Whereas uniform dispersions were achieved in this example with simple hand-stirring, dispersing the original neat polymers at this same percentage (3% by weight) in the same asphalt required 30 minutes of mixing at 350° F. using a high-speed, high-shear Ross mixer.

EXAMPLE 3

Various asphalt emulsions were prepared by heating and maintaining polymerdialkyl amide-asphalt blends prepared in Example 2 at 250°-300° F., preferably at 285°-295° F. Arosurf AA-28 or AA-78 emulsifier (Sherex Chemical Company) at 1.0% by weight and other additives were added to the continuous water phase and neutralized to a pH of 2.0-3.0 by the addition of hydrochloric acid. This solution was maintained at a temperature of 100°-125° F. The asphalt and the emulsifier solution were then blended together with a colloid mill to yield the desired emulsion.

Specific dialkyl amides tested were dimethyl formamide, dimethyl octadecyl amide, dimethyl cocoamide, dimethyl tallow amide, dimethyl hard tallow amide, dimethyl oleyl amide, dimethyl canola amide, dimethyl stearyl amide, diethyl hard tallow amide, and dibutyl hard tallow amide.

All emulsifier solutions were adjusted to pH 2.0 by addition of hydrochloric acid. All emulsions were tested in accordance with ASTM D-2397, and the test results are shown in Table 2. The polymer content, for those emulsions containing polymers, was 3.0% by weight polymer in asphalt. All emulsions tested passed maximum sieve test specifications of 0.10% as required for CRS-2. Emulsion viscosities were measured using a Saybolt Furol viscometer at 122° F. in accordance with ASTM D-2397. Starting and ending asphalt penetrations were determined prior to and following incorporation of additives and/or polymers, per ASTM D-5. All emulsions were stored at approximately 140° F.

TABLE 2

| Formulation | Weight % | | | Viscosity, SSF | | | Penetration | | |
|---|---|---|---|---|---|---|---|---|---|
| | Emulsifier | Aqueous | Residue | 1 Day | 7 Day | Asphalt | Start | End | Polymer |
| 263-31-1 | AA-78 | 0.85 | 70.4 | 27 | — | AC-5 | 160 | — | 4455X[3] |
| 263-32-2 | AA-28 | 0.85 | 71.3 | 50 | 62 | AC-5 | 160 | — | 4463X[4] |
| 263-94-1 | AA-28 | 1.00 | 80 | 107 | AC-5 | 160 | — | 4455X | |
| 263-95-1 | AA-28 | 1.00 | 70.1 | 34 | 31 | AC-5 | 160 | — | 4463X |
| 263-94-5 | AA-78 | 1.00 | 70.5 | 57 | 55 | AC-5 | 160 | -4455X | |
| 263-124-1 | AA-28 | 1.03 | 70.4 | 616 | — | AC-5 | 160 | —Blend 1[5] | |
| 263-130-3 | AA-28 | a.03 | 69.4 | 317 | 311. AC-5 | 187 | — | — | |
| 263-136-2 | AA-28 | 1.03 | 68.3 | 226 | 261 | AC-20 | 75 | — | — |
| 263-138-2 | AA-28 | 1.03 | 69.6 | 386 | 386 | AC-20 | 75 | 134 | Blend 1 |
| 263-150-3 | AA-28 | 1.03 | 67.5 | 230 | 201 | AC-20[1] | 75 | 111 | — |
| 263-151-3 | AA-28 | 1.03 | 68.8 | 476 | 403 | AC-20[2] | 75 | 116 | — |
| 263-154-3 | AA-28 | 1.00 | 67.7 | 236 | 241 | AC-20 | 75 | — | — |
| 263-178-3 | AA-28 | 1.00 | 70.4 | 273 | 291 | AC-20 | 82 | 135 | Blend 2[6] |
| 263-179-2 | AA-28 | 1.00 | 68.5 | 387 | 369 | AC-20 | 82 | 135 | Blend 3[7] |
| 263-180-2 | AA-28 | 1.00 | 66.5 | 160 | 127 | AC-20 | 82 | 130 | Blend 4[8] |
| 263-183-3 | AA-28 | 1.00 | 70.7 | 439 | 507 | AC-20 | 82 | 132 | Blend 5[9] |
| 263-189-1 | AA-28 | 1.00 | 71.9 | 187 | — | AC-20 | 82 | — | 4463X |

[1]3% by weight DMOA added to asphalt.
[2]3% bt weight Dutrex extended oil (Shell Chemical Company) added to asphalt.
[3]4455X = Kraton D-4455X, linear SB copolymer
[4]4463X = Kraton D-4463X, linear SBS copolymer.
[5]Blend 1 = 25% Kraton D-1101G linear SBS copolymer (11011G), 25% Kraton D1118 GX diblock SB copolymer (1118 GX), and 50% DMOA.
[6]Blend 2 = 25% 1101 G, 25% 1118 GX, and 59% DMTA.
[7]Blend 3 = 25% 1101G, 25% 1118GX, and 50% DMHTA.
[8]Blend 4 = 25% 1101G, 25% 1118GX, and 50% DMCOA.
[9]Blend 5 = 25% 1101 G, 25% 1118GX, and 50% DMSA.

From the foregoing description, one skilled in the art can easily ascertain the assential characteristics of this invention and, without departing from the spirit and scope thereof, can make various changes and modifications of the invention to adapt it to various usages and conditions.

We claim:
1. A polymer-modified asphalt composition, which comprises a mixture of:
(a) a blend of from about 10 to about 75 weight-percent of one or more of a thermoplastic rubber polymer and from about 90 to about 25 weight-percent of one or more of a fatty dialkyl amide having the formula:

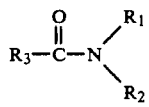

wherein:
$R_1$ and $R_2$ are the same or different moieties and are selected from $C_1$–$C_8$ alkyl groups; and
$R_3$ is a $C_6$–$C_{22}$ alkyl group; and
(b) an asphalt cement.

2. The composition of claim 1 wherein the thermoplastic rubber polymer is a triblock copolymer.

3. The composition of claim 2 wherein the thermoplastic rubber polymer is selected from the group consisting of styrene-butadiene-styrene, styrene-ethylene/-butylene-styrene, and styrene-isoprene-styrene, or a mixture thereof.

4. The composition of claim 1 wherein the thermoplastic rubber is ethylenevinyl acetate.

5. The composition of claim 2 wherein $R_1$ and $R_2$ are both methyl groups.

6. The composition of claim 3 wherein the fatty dialkyl amide is selected from the group consisting of dimethyl hard tallow amide and dimethyl stearyl amide, or a mixture thereof.

7. The composition of claim 1 wherein the thermoplastic rubber polymer and the fatty dialkyl amide are present in approximately equal parts by weight.

8. The composition of claim 7 wherein the thermoplastic rubber polymer is selected from the group consisting of styrene-butadiene-styrene, styrene-ethylene/-butylene-styrene, and styrene-isoprene-styrene, or a mixture thereof, and the fatty dialkyl amide has the formula:

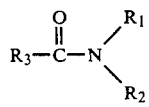

wherein:
$R_1$ and $R_2$ are the same or different moieties and are selected from $C_1$–$C_8$ alkyl groups; and
$R_3$ is a $C_6$–$C_{22}$ alkyl group.

9. The composition of claim 8 wherein the fatty dialkyl amide is dimethyl hard tallow amide.

10. An asphalt emulsion comprising the polymer-modified asphalt composition of claim 1, water, and an emulsifying amount of an emulsifying agent.

11. An asphalt emulsion comprising the polymer-modified asphalt composition of claim 8, water, and an emulsifying amount of an emulsifying agent.

12. A method for preparing a polymer-modified asphalt composition, which comprises the steps of:
(a) blending from about 10 to about 75 weight-percent of one or more of a thermoplastic rubber polymer and from about 90 to about 25 weight-percent of one or more of a fatty dialkyl amide having the formula:

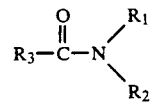

wherein:
$R_1$ and $R_2$ are the same or different moieties and are selected from $C_1$–$C_8$ alkyl groups; and
$R_3$ is a $C_6$–$C_{22}$ alkyl group; and
(b) dispersing the resultant polymer-amide blend into an asphalt cement.

13. The method of claim 12 wherein the thermoplastic rubber polymer is a triblock copolymer.

14. The method of claim 13 wherein the polymer is selected from the group consisting of styrene-butadiene-styrene, styrene-ethylene/butylene-styrene, and styreneisoprene-styrene, or a mixture thereof.

15. The method of claim 13 wherein $R_1$ and $R_2$ are both methyl groups.

16. The method of claim 14 wherein the fatty dialkyl amide is selected from the group consisting of dimethyl hard tallow amide and dimethyl stearyl amide, or a mixture thereof.

17. The method of claim 12 wherein the thermoplastic rubber polymer and the fatty alkyl amide are present in approximately equal parts by weight.

18. The method of claim 16 wherein the thermoplastic rubber polymer and the fatty alkyl amide are present in approximately equal parts by weight.

19. A method for preparing a polymer-modified asphalt composition, which comprises the steps of:
(a) dispersing into an asphalt cement one or more of a fatty dialkyl amide having the formula:

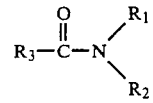

wherein:
$R_1$ and $R_2$ are the same or different moieties and are selected from $C_1$–$C_8$ alkyl groups; and
$R_3$ is a $C_6$–$C_{22}$ alkyl group; and
(b) subsequently adding to said asphalt cement one or more of a thermoplastic rubber polymer.

* * * * *